United States Patent
Colombi

(10) Patent No.: US 10,742,066 B2
(45) Date of Patent: Aug. 11, 2020

(54) COMMUNICATION SYSTEMS AND METHODS IN UNINTERRUPTIBLE POWER SUPPLY SYSTEMS

(71) Applicant: ABB Schweiz AG, Baden (CH)

(72) Inventor: Silvio Colombi, Losone (CH)

(73) Assignee: ABB Schweiz AG, Baden (CH)

( * ) Notice: Subject to any disclaimer, the term of this patent is extended or adjusted under 35 U.S.C. 154(b) by 176 days.

(21) Appl. No.: 16/018,648

(22) Filed: Jun. 26, 2018

(65) Prior Publication Data

US 2019/0393720 A1    Dec. 26, 2019

(51) Int. Cl.
 *H02J 9/06*    (2006.01)
(52) U.S. Cl.
 CPC .............. *H02J 9/06* (2013.01); *H02J 9/068* (2020.01)
(58) Field of Classification Search
 CPC ................................... H02J 9/06; H02J 9/068
 USPC ............................................. 307/23, 64, 66
 See application file for complete search history.

(56) References Cited

U.S. PATENT DOCUMENTS

| | | | |
|---|---|---|---|
| 8,051,327 B2 | 11/2011 | Seaton | |
| 8,212,401 B2 | 7/2012 | Linkhart et al. | |
| 8,754,544 B2 | 6/2014 | Colombi et al. | |
| 9,081,568 B1 | 7/2015 | Ross et al. | |
| 9,831,675 B2 | 11/2017 | Colombi et al. | |
| 2013/0019124 A1 | 1/2013 | Grimshaw | |
| 2014/0292105 A1 | 10/2014 | Hsieh | |
| 2016/0181861 A1 | 6/2016 | Familiant et al. | |
| 2018/0138740 A1 | 5/2018 | Churnock et al. | |

FOREIGN PATENT DOCUMENTS

WO    2016099938 A1    6/2016

OTHER PUBLICATIONS

Fulgenzi et al., "UPS interconnected with STS to improve power-supply continuity in the Gran Sasso National Laboratory", Industrial Electronics, IEEE International Symposium, vol. 01, Feb. 2002.
Rahmat et al., "Reliability Comparison of Uninterruptible Power Supply (UPS) System Configurations", Intelec 2013 35th International Telecommunications Energy Conference, smart power and efficiency, Germany, pp. 01-06, Oct. 2013.
McCarthy et al., "Comparing UPS System Design Configurations", Schneider Electric's Data Center Science Center, pp. 01-27.

(Continued)

*Primary Examiner* — Hal Kaplan
(74) *Attorney, Agent, or Firm* — Barnes & Thornburg LLP

(57) ABSTRACT

A power supply system is provided. The power supply system includes at least one uninterruptible power supply (UPS), a catcher system including at least one catcher UPS, at least one static transfer switch (STS), each STS electrically coupled between an associated UPS and an associated load, each STS further electrically coupled between the catcher system and the associated load, and each STS operable to selectively switch between supplying power to the associated load from the associated UPS and supplying power to the associated load from the catcher system. The power supply system further includes a first communications channel communicatively coupling the at least one UPS to the catcher system, and at least one second communications channel, wherein each STS is communicatively coupled to the associated UPS by a second communications channel of the at least one second communications channel.

20 Claims, 4 Drawing Sheets

(56) References Cited

OTHER PUBLICATIONS

"Using a Reserve Power Architecture to Increase Data Center Infrastructure Utilization and Efficiency", A White Paper on Data Center Efficiency, pp. 1-12.
Extended European Search Report and Written Opinion for EP 19182227.9-1202, dated Nov. 21, 2019, 8 pages.

COMMUNICATION SYSTEMS AND METHODS IN UNINTERRUPTIBLE POWER SUPPLY SYSTEMS

BACKGROUND

The field of the invention relates generally to uninterruptible power supplies, and more particularly, to communications in uninterruptible power supply systems that utilize a catcher architecture.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

At least some known power systems utilize a catcher architecture or reserve architecture, in which each UPS supplies power to a single load. In the event of failure of the UPS, a switch switches the load to a catcher system to maintain power supply to the load. However, at least some known catcher architectures have drawbacks that result in overloading the catcher system and/or dropping the load.

BRIEF DESCRIPTION

In one aspect, a power supply system is provided. The power supply system includes at least one uninterruptible power supply (UPS), a catcher system including at least one catcher UPS, at least one static transfer switch (STS), each STS of the at least one STS electrically coupled between an associated UPS of the at least one UPS and an associated load, each STS further electrically coupled between the catcher system and the associated load, and each STS operable to selectively switch between supplying power to the associated load from the associated UPS and supplying power to the associated load from the catcher system. The power supply system further includes a first communications channel communicatively coupling the at least one UPS to the catcher system, and at least one second communications channel, wherein each STS is communicatively coupled to the associated UPS by a second communications channel of the at least one second communications channel.

In another aspect, a method of operating a power supply system is provided. The power supply system includes at least one uninterruptible power supply (UPS), a catcher system including at least one catcher UPS, and at least one static transfer switch (STS), each STS of the at least one STS electrically coupled between an associated UPS of the at least one UPS and an associated load, each STS further electrically coupled between the catcher system and the associated load, and each STS operable to selectively switch between supplying power to the associated load from the associated UPS and supplying power to the associated load from the catcher system. The method includes transmitting at least one message over at least one of a first communications channel and at least one second communications channel, wherein the first communications channel communicatively couples the at least one UPS to the catcher system, and wherein each STS is communicatively coupled to the associated UPS by a second communications channel of the at least one second communications channel.

In yet another aspect, a method of providing enhanced communication capabilities for a power supply system is provided. The power supply system includes at least one uninterruptible power supply (UPS), a catcher system including at least one catcher UPS, and at least one static transfer switch (STS), each STS of the at least one STS electrically coupled between an associated UPS of the at least one UPS and an associated load, each STS further electrically coupled between the catcher system and the associated load, and each STS operable to selectively switch between supplying power to the associated load from the associated UPS and supplying power to the associated load from the catcher system. The method includes communicatively coupling the at least one UPS to the catcher system using a first communications channel, and communicatively coupling each STS to the associated UPS using at least one second communications channel.

DETAILED DESCRIPTION

Exemplary embodiments of an uninterruptible power supply system are described here. In a power system, uninterruptible power supplies (UPSs) are each coupled to associated loads through a static transfer switch (STS). Further, a catcher system includes at least one catcher UPS that is operable to supply power to the loads in the event of UPS failure. To facilitate communications, a first communications channel communicatively couples the UPSs to the catcher system. Further, at least one second communications channel couples each UPS to the associated STS. These communications channels enable improved operation of the power system, as described herein.

Figure 1:
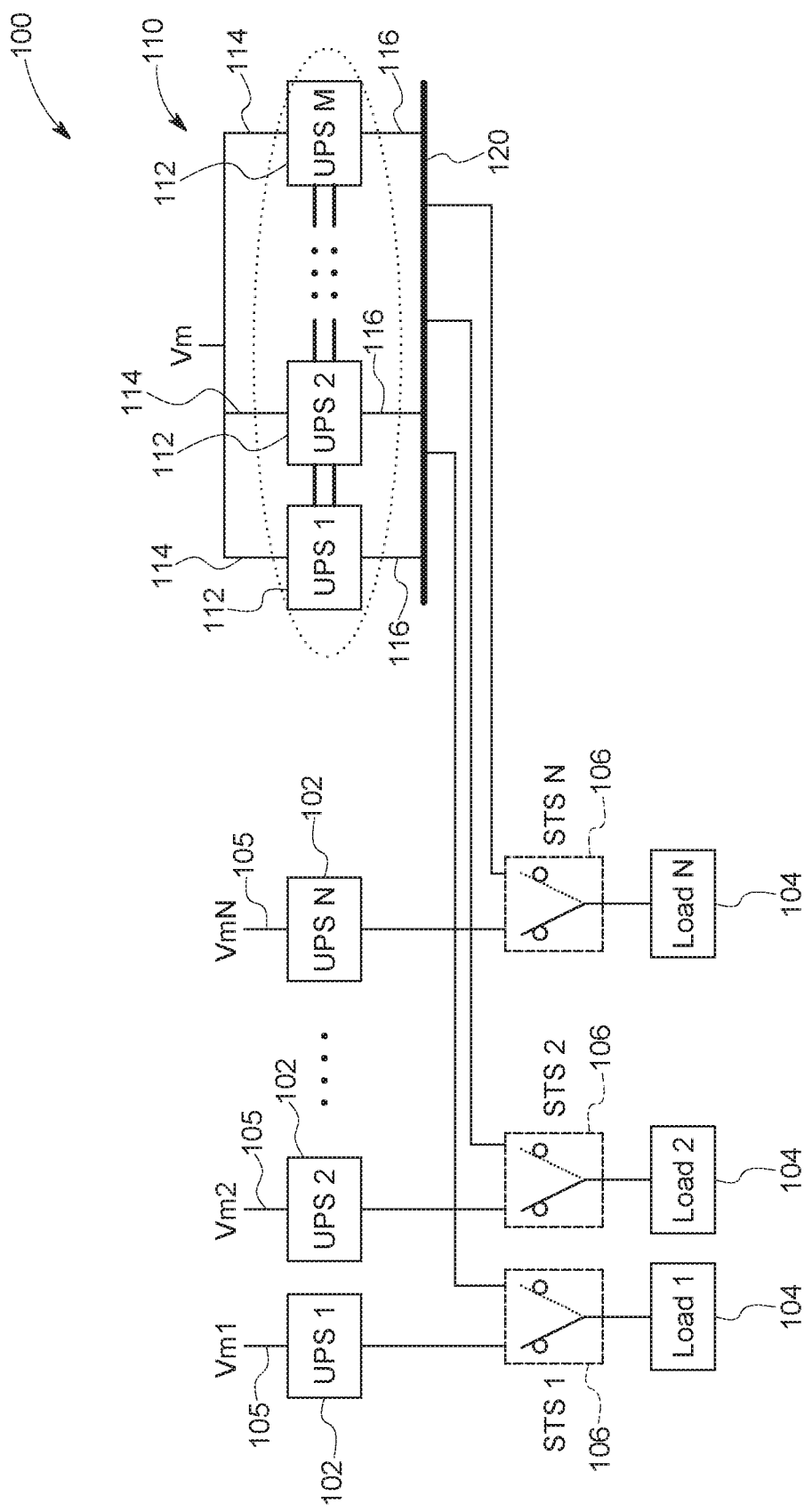
FIG. 1 is a diagram of an exemplary catcher uninterruptible power supply (UPS) architecture.

FIG. 1 is a schematic diagram of an exemplary catcher uninterruptible power supply (UPS) architecture 100. In the exemplary embodiment, architecture 100 includes a plurality of UPSs 102. Specifically, architecture 100 includes N UPSs 102 in the exemplary embodiment. Alternatively, architecture 100 may include any number of UPSs 102 that enable architecture 100 to function as described herein. In the exemplary embodiment, each UPS 102 has a corresponding input 105 connected to an input voltage Vm1, Vm2 . . . VmN, and each UPS 102 supplies power to a corresponding load 104. Input voltages Vm1, Vm2 . . . VmN may come from the same voltage source or from different voltage sources. Further, each UPS 102 is coupled to associated load 104 through a static transfer switch (STS) 106.

In the exemplary embodiment, architecture 100 is a three wire system. Alternatively, architecture 100 may be a four wire system (e.g., to supply power to loads that require a neutral wire). Further, in the exemplary embodiment, each UPS 102 is a double conversion UPS. Alternatively, each UPS 102 may be any type of UPS 102 that enables architecture 100 to function as described herein.

Architecture 100 includes a catcher system 110 to facilitate protecting loads 104 in the event of failure of one or more UPSs 102. Specifically, catcher system 110 includes at least one catcher UPS 112 configured to supply power to a load 104 in the event of UPS failure. In the exemplary embodiment, catcher system 110 includes M catcher UPSs 112. Catcher UPSs 112 operate in parallel to share loads 104 as needed during UPS failure. As catcher UPSs 112 are only needed during failure of one or more UPSs 102, M is generally less than N. For example, in some embodiments, catcher system 110 only includes one or two catcher UPSs 112. Alternatively, catcher system 110 may include any number of catcher UPSs 112 that enables catcher system 110 to function as described herein.

In the exemplary embodiment, inputs 114 of each catcher UPS 112 may be connected to the same input voltage Vm, and outputs 116 of each catcher UPS 112 are connected to an output bus 120. Further, output bus 120 is coupled to STSs 106. During failure of a UPS 102, the STS 106 for that UPS 102 will switch the associated load 104 to catcher system 110.

Figure 2:
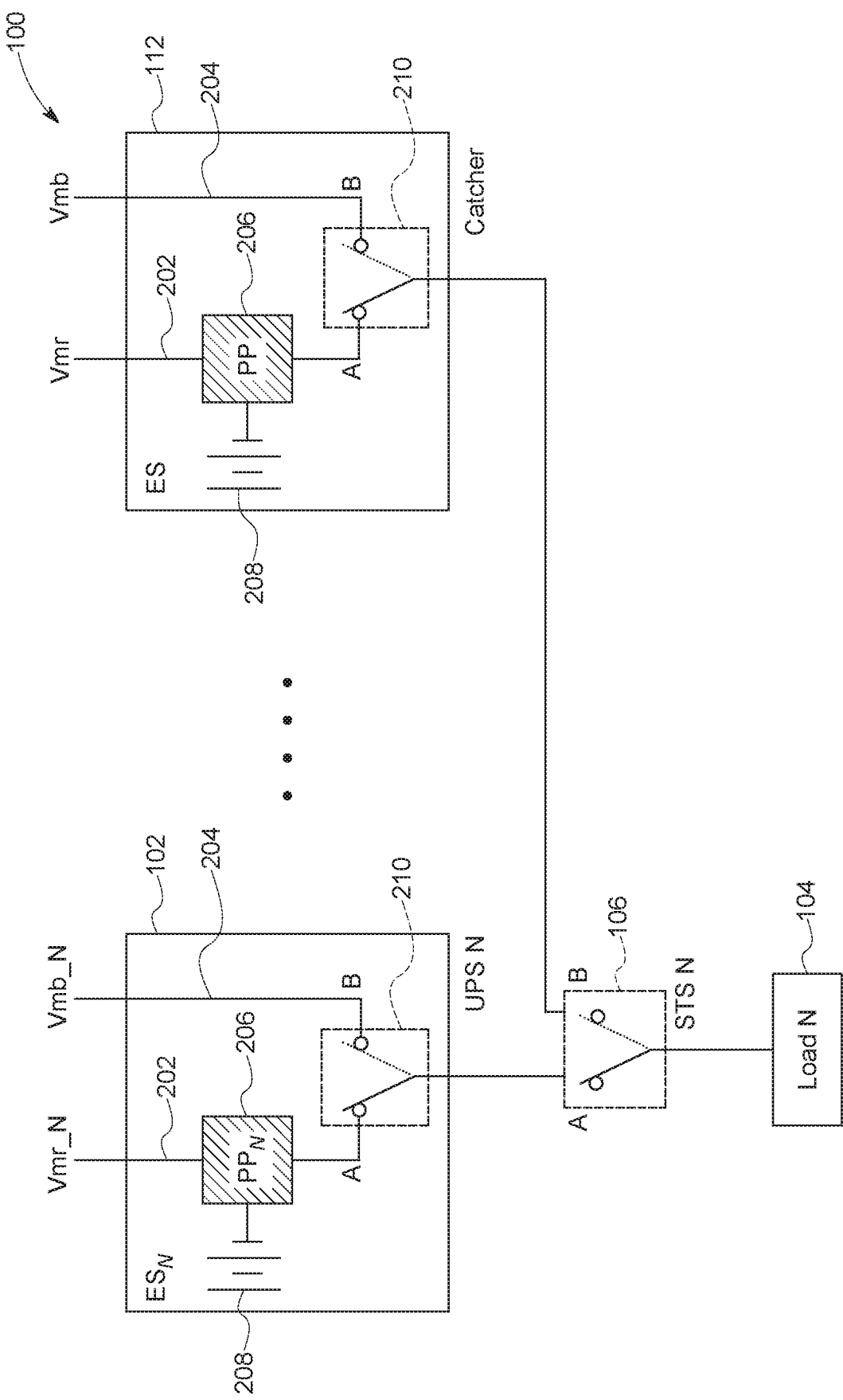
FIG. 2 is a simplified schematic diagram including one UPS and one catcher UPS of the architecture shown in FIG. 1.

FIG. 2 is a simplified schematic diagram including one UPS 102 (here, the Nth UPS 102) and catcher system 110 including one catcher UPS 112. As shown in FIG. 2, UPS 102 includes a rectifier-inverter path 202 in parallel with a bypass path 204. Rectifier-inverter path 202 is connected to a rectifier input voltage Vmr_N, and bypass path 204 is coupled to a bypass input voltage Vmb_N. The rectifier input voltage Vmr_N, and the bypass input voltage Vmb_N may be the same voltage or different voltages (i.e., they may come from the same voltage source or different voltage sources).

Rectifier-inventor path 202 includes a power processing unit 206 coupled to an energy storage device 208. In the exemplary embodiment, power processing unit 206 includes a rectifier, an inverter, and an energy storage converter (none shown). Power processing unit 206 converts power at rectifier input voltage Vmr_N and keeps energy storage device 208 charged so that UPS 102 is capable of providing power to load 104 at a clean, stable, and reliable voltage. If rectifier input voltage Vmr_N falls outside of a predetermined range (e.g., during an outage of an upstream utility), power processing unit 206 converts power from energy storage device 208 to supply power to load 104. Further, UPS 102 includes a UPS switch 210 for selectively switching between rectifier-inverter path 202 and bypass path 204. UPS switch 210 may include contactors, thyristor switches, etc. (none shown).

Similar to UPS 102, in the exemplary embodiment, catcher UPS 112 also includes a rectifier-inverter path 202 (connected to a rectifier input voltage Vmr), a bypass path 204 (connected to a bypass input voltage Vmb), a power processing unit 206, an energy storage device 208, and a UPS switch 210. The corresponding components of catcher UPS 112 operate substantially similar to those of UPS 102.

There are a number of issues that may arise during operation of architecture 100. For example, if multiple STSs 106 transfer their loads 104 to catcher system 110 (e.g., due to multiple UPS failures), catcher system 110 may become overloaded. If catcher system 110 becomes overloaded, catcher UPSs 112 will eventually transfer to their bypass paths 204, exposing loads 104 to raw input power, which is undesirable.

Further, in architecture 100, bypass paths 204 of UPSs 102 are generally disabled, as STSs 106 (instead of UPS switches 210) are expected to switch to protect loads 104. However, if an STS 106 does not switch due to a failure, the associated load 104 will be dropped. In some situations, bypass paths 204 are not completely disabled, but their activation mechanisms are controlled and delayed to enable STS 106 to switch first. In this case, however, failure of STS 106 to switch will result in a significantly degraded voltage being applied to load 104. Accordingly, bypass paths 204 of UPSs 102 may be configured to pick up the load only when there is a short-circuit at an output of STS 106. Further, it is not desirable for STS 106 to switch the load 104 to catcher system 110 in the event of an output short-circuit, as this would result in transferring the fault to catcher system 110.

In addition, in scenarios where the input voltages (i.e., Vm, Vm1, Vm2 . . . VmN) are different from one another, STSs 106 need to be capable of switching between unsynchronized sources, requiring advanced static switches, as well as longer transfer times. Further, even with the same input voltages, if one or more UPSs 102 provide power using energy storage devices 208, the phases of the output power of the one or more UPSs 102 will gradually shift relative to the other UPSs 102 and catcher system 110.

As demonstrated by FIG. 2, at any point in time, load 104 may be fed by i) rectifier-inverter path 202 of UPS 102, ii) rectifier-inverter path 202 of catcher UPS 112, iii) bypass path 204 of UPS 102, or iv) bypass path 204 of catcher UPS 112. Feeding load 104 using rectifier-inverter path 202 of UPS 102 or rectifier-inverter path 202 of catcher UPS 112 results in clean and reliable power being supplied to load 104.

The following Table 1 shows all eight possible states of STS 106 (with A indicating STS 106 is switched to UPS 102 and B indicating STS 106 is switched to catcher UPS 112), UPS switch 210 of UPS 102 (with A indicating UPS switch 210 of UPS 102 is switched to rectifier-inverter path 202 of UPS 102 and B indicating UPS switch 210 of UPS 102 is switched to bypass path 204 of UPS 102), and UPS switch 210 of catcher UPS 112 (with A indicating UPS switch 210 of catcher UPS 112 is switched to rectifier-inverter path 202 of catcher UPS 112 and B indicating UPS switch 210 of catcher UPS 112 is switched to bypass path 204 of catcher UPS 112). Each state is briefly described in Table 1. As indicated in Table 1, only states 1 and 5 are desirable (with load 104 mainly coupled to rectifier-inverter path 202 of UPS 102, and being switched to rectifier-inverter path 202 of catcher UPS 112 as needed).

TABLE 1

| State | STS | UPS | CATCHER | |
|---|---|---|---|---|
| 1 | A | A | A | Normal situation |
| 2 | A | A | B | Undesirable, may result from overload of catcher system 110 due to too many STSs 106 switching to catcher system 110 |
| 3 | A | B | A | Undesirable, switched to UPS 102 bypass path 204 |
| 4 | A | B | B | Undesirable, may result from overload of catcher system 110 due to too many STSs 106 switching to catcher system 110 Also undesirable because switched to UPS 102 bypass path 204 |
| 5 | B | A | A | Expected operation of catcher system 110, UPS 102 has failed and STS 106 switches load 104 to catcher UPS 112 |
| 6 | B | A | B | Undesirable, may result from overload of catcher system 110 due to too many STSs 106 switching to catcher system 110 |
| 7 | B | B | A | Undesirable because switched to UPS 102 bypass path 204 |
| 8 | B | B | B | Undesirable, may result from overload of catcher system 110 due to too many STSs 106 switching to catcher system 110 Also undesirable because switched to UPS 102 bypass path 204 |

Further, in architecture 100, the controls for STS 106, UPS switch 210 of UPS 102, and UPS switch 210 of catcher UPS 112 are independent of and isolated from one another, resulting in the aforementioned issues that may arise during operation of architecture 100.

Figure 3:
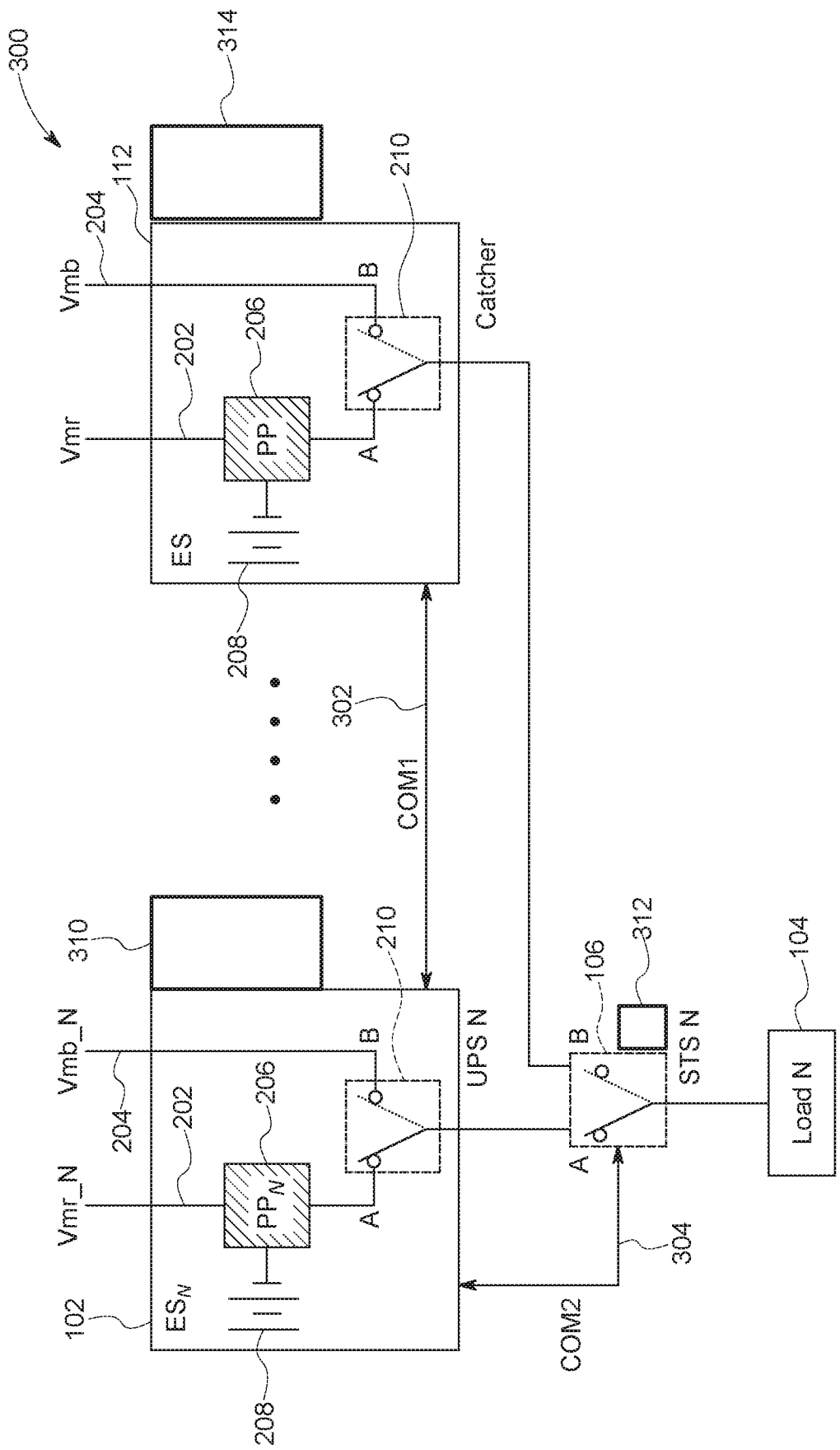
FIG. 3 is a simplified schematic diagram of one UPS and one catcher UPS of another exemplary catcher UPS architecture.
Figure 4:
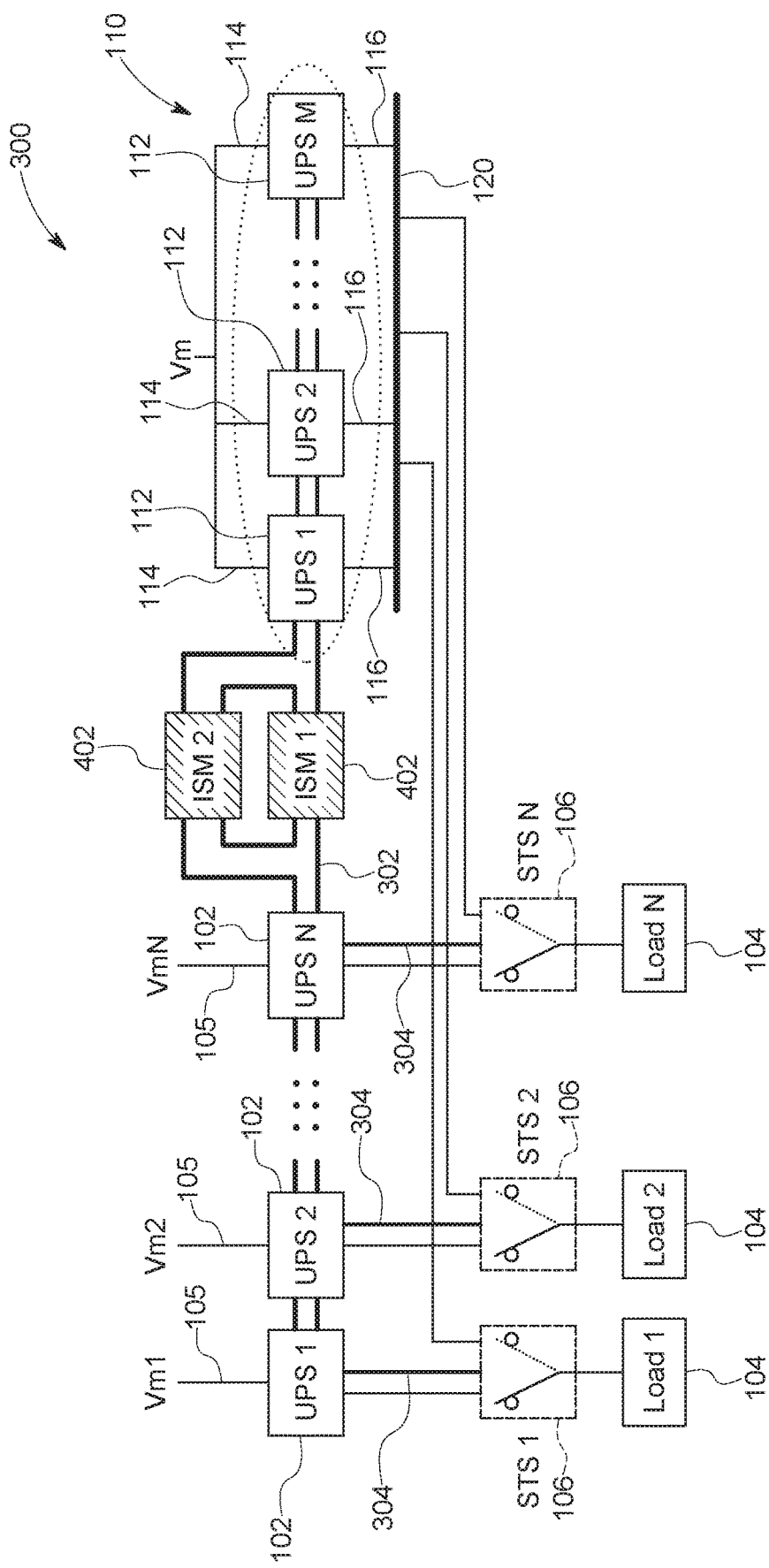
FIG. 4 is a schematic diagram of the another exemplary catcher uninterruptible power supply (UPS) architecture.

FIGS. 3 and 4 are schematic diagrams of an exemplary catcher UPS architecture 300 that addresses the issues discussed above in relation to architecture 100. Unless otherwise indicated, components of architecture 300 are substantially similar to components of architecture 100. FIG. 3 is a simplified schematic diagram including one UPS 102 (here, the Nth UPS 102) and one catcher UPS 112 of architecture 300, and FIG. 4 is a schematic diagram of the overall architecture 300.

As shown in FIG. 3, in the exemplary embodiment, architecture 300 includes a first communications channel 302 communicatively coupling UPS 102 to catcher UPS 112, and a second communications channel 304 communicatively coupling UPS 102 to STS 106. Using first and second communications channels 302 and 304, data is exchanged between UPS 102, catcher UPS 112, and STS 106, and that data exchange can be used to avoid the aforementioned issues, as described herein. First and second communications channels 302 and 304 may be any wired and/or wireless communications channel that enables architecture 300 to function as described herein. In some embodiments, first communications channel 302 is implemented using at least one intelligent synchronization module (ISM), as described below in reference to FIG. 4.

Communications channels 302 and 304 facilitate avoiding overloading of catcher system 110 and facilitate using bypass paths 204 when appropriate, as described herein. Further, communications channels 302 and 304 allow architecture 300 to operate with different input voltages and/or at least one UPS 102 providing power using energy storage device 208. In addition, first and second communications channels 302 and 304 allow for architecture 300 to appropriately react in case of a short-circuit at the output of an STS 106, as described herein. These advantages all result in architecture 300 having an improved functionality and reliability relative to architecture 100.

As shown in FIG. 3, in the exemplary embodiment, in architecture 300, UPS 102 includes a UPS control unit 310, STS 106 includes an STS control unit 312, and catcher UPS 112 includes a catcher UPS control unit 314. UPS control unit 310, STS control unit 312, and catcher UPS control unit 314 are operable to control UPS 102, STS 106, and catcher UPS 112, respectively, based on data exchanged using first and second communications channels 302 and 304.

Each of UPS control unit 310, STS control unit 312, and catcher UPS control unit 314 may include its own power system (not shown) such as a dedicated energy source (e.g., a battery). In some embodiments, each of UPS control unit 310, STS control unit 312, and catcher UPS control unit 314 is coupled to a substitute controller (not shown) that may be used in the event that UPS control unit 310, STS control unit 312, or catcher UPS control unit 314 fails.

In the exemplary embodiment, each of UPS control unit 310, STS control unit 312, and catcher UPS control unit 314 is implemented by a processor communicatively coupled to a memory device for executing instructions (neither shown). In some embodiments, executable instructions are stored in the memory device. Alternatively, UPS control unit 310, STS control unit 312, and catcher UPS control unit 314 may be implemented using any circuitry that enables each of UPS control unit 310, STS control unit 312, and catcher UPS control unit 314 to function as described herein.

In the exemplary embodiment, each of UPS control unit 310, STS control unit 312, and catcher UPS control unit 314 performs one or more operations described herein by programming the processor. For example, the processor may be programmed by encoding an operation as one or more executable instructions and by providing the executable instructions in the memory device. The processor may include one or more processing units (e.g., in a multi-core configuration). Further, the processor may be implemented using one or more heterogeneous processor systems in which a main processor is present with secondary processors on a single chip. As another illustrative example, the processor may be a symmetric multi-processor system containing multiple processors of the same type. Further, the processor may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, the memory device is one or more devices that enable information such as executable instructions and/or other data to be stored and retrieved. The memory device may include one or more computer readable media, such as, without limitation, dynamic random access memory (DRAM), static random access memory (SRAM), a solid state disk, and/or a hard disk. The memory device may be configured to store, without limitation, application source code, application object code, source code portions of interest, object code portions of interest, configuration data, execution events and/or any other type of data.

As noted above, first and second communications channels 302 and 304 provide several advantages for architecture 300.

For example, in the exemplary embodiment, when catcher system 110 is fully loaded (i.e., the catcher system 110 is operating above a predetermined capacity such that the total amount of loads 104 switched to catcher system 110 is relatively close to or is equal to a maximum capacity of all catcher UPSs 112 in catcher system 110), catcher system 110 transmits a message across first communications channel 302 to all UPSs 102, the message indicating that catcher system 110 is fully loaded. In response to receiving this message, each UPS 102 enables their bypass path 204 for activation and/or modifies activation mechanisms of bypass path 204 (e.g., by adjusting a delay period or by increasing sensitivity to voltage deviations). Further, in response to receiving this message, each UPS 102 transmits a message across second communications channel 304 to the associated STS 106, the message instructing STS 106 to disable switching to catcher system 110. This messaging scheme prevents overloading of catcher system 110 (because STSs 106 are instructed not to switch to catcher system 110), and substantially improves reliability (because each UPS 102 is prepared to use bypass path 204 in the event of UPS failure). With bypass path 204 enabled, the mean time between failure (MTBF) for UPS 102 increases significantly (e.g., from approximately 20,000 hours to approximately 120,000 hours).

In another example, when STS 106 encounters a failure (e.g., a logic failure or power failure), and is unable to switch, STS 106 transmits a message across second communications channel 304 to UPS 102, the message indicating that STS 106 is incapable of switching to catcher system 110 in the event of UPS failure. In response to receiving this message, UPS 102 enables bypass path 204 for activation and/or modifies activation mechanisms of bypass path 204 (e.g., by adjusting a delay period or by increasing sensitivity to voltage deviations). As noted above, with bypass path 204 enabled, the MTBF for UPS 102 increases significantly (e.g., from approximately 20,000 hours to approximately 120,000 hours).

In another example, using second communications channel 304, UPS 102 and STS 106 exchange messages to determine the appropriate response in the event of a short-circuit at the output of STS 106. In the exemplary embodiment, in the event of a short-circuit at the output of STS 106, STS 106 transmits a message to UPS 102 across second communications channel 304, the message indicating that the short-circuit has occurred. In response, UPS 102 switches from rectifier-inverter path 202 to bypass path 204 to clear the fault faster, potentially saving load 104. The fault may be cleared faster using bypass path 204 because a utility providing power to UPS 102 may have a higher short-circuit capability with respect to the inverter in rectifier-inverter path 202. Alternatively, UPS 102 and STS 106 may implement alternative responses in the event of a short-circuit at the output of STS 106.

In yet another example, first and second communications channels 302 and 304 enable STSs 106 to quickly switch between unsynchronized sources (i.e., when voltages Vm, Vm1, Vm2 . . . VmN are different from one another). Specifically, in the exemplary embodiment, when catcher system 110 is unloaded (i.e., all of catcher UPSs 112 are not supplying power to loads 104), catcher system 110 transmits a message to UPSs 102 across first communications channel 302, the message indicating that catcher system 110 is unloaded. In response, each UPS 102 (and specifically an inverter of each UPS 102) synchronizes to the phase of the output of catcher system 110. Accordingly, in the event of UPS failure, when an STS 106 switches between UPS 102 and catcher UPS 112, STS 106 will switch between two in phase power sources.

Further, when catcher system 110 is fully loaded, catcher system 110 transmits a message to UPSs 102 across first communications channel 302, the message indicating that catcher system 110 is fully loaded. In response, each UPS 102 (and specifically an inverter of each UPS 102) synchronizes to the phase of bypass path 204, and enables bypass path 204 for activation and/or modifies activation mechanisms of bypass path 204 (e.g., by adjusting a delay period or by increasing sensitivity to voltage deviations). Further, each UPS 102 transmits a message across second communications channel 304 to the associated STS 106, the message instructing STS 106 to disable switching to catcher system 110. This messaging scheme is also applicable when at least one UPS 102 provides power using energy storage device 208.

First and second communications channels 302 and 304 further enable UPSs 102 and catcher system 110 to exchange information regarding the current capability of catcher system 110 and the requirements of loads 104 (which are known to the associated UPS 102), and adjust operation accordingly.

For example, assume a system includes four UPSs 102: a first UPS coupled to a first load requiring 100 units of power, a second UPS coupled to a second load requiring 200 units of power, a third UPS coupled to a third load requiring 300 units of power, and a fourth UPS coupled to a fourth load requiring 400 units of power. Further, assume catcher system 110 has a total capability of supplying 600 units of power. Accordingly, if the fourth load is switched to catcher system 110, catcher system 110 has a remaining capability of 200 units of power. As such, catcher system could accept the first load (which requires 100 units of power) or the second load (which requires 200 units of power), but cannot accept the third load (which requires 300 units of power).

Using first and second communications channels 302 and 304, this capability information is communicated between UPSs 102 and catcher system 110, and UPSs 102 and associated STSs 106 are selectively configured accordingly. Specifically, in this example, associated STSs 106 for the first and second UPS are configured to be switchable to catcher system 110 (because catcher system 110 can accept the first or second load in the event of UPS failure), while for the third UPS, the associated STS 106 is disabled from switching to catcher system 110, and bypass path 204 of the third UPS is enabled for activation (because catcher system 110 cannot accept the third load in the event of UPS failure). Further, this functionality may be implemented in conjunction with the previously described examples to facilitate synchronization and avoiding overloading of catcher system 110.

In FIG. 4, first communications channel 302 is implemented using at least one intelligent synchronization module (ISM) 402. ISM 402 is a control system that exchanges information, performs synchronizations, and executes control algorithms and commands. In the exemplary embodiment, for redundancy, first communications channel 302 includes two ISMs 402. Alternatively, first communications channel 302 may include a single ISM 402.

ISMs 402 are coupled between UPSs 102 and catcher system 110 and exchange information between UPSs 102 and catcher system 110. In the exemplary embodiment, the input signals to ISM 402 include phase information for each UPS 102 and for catcher system 110. Further, output signals from ISM include command signals instructing UPSs 102 and/or catcher system 110 to sync, as described herein.

Exemplary embodiments of systems and methods for communications in uninterruptible power supply systems are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) improving communications in a catcher UPS architecture; (b) reducing overloading of a catcher system; (c) reducing dropping of loads; and (d) improving switching between non-synchronous sources.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power supply system comprising:
    at least one uninterruptible power supply (UPS);
    a catcher system comprising at least one catcher UPS;
    at least one static transfer switch (STS), each STS of said at least one STS electrically coupled between an associated UPS of said at least one UPS and an associated load, each STS further electrically coupled between said catcher system and the associated load, and each STS operable to selectively switch between supplying power to the associated load from said associated UPS and supplying power to the associated load from said catcher system;
    a first communications channel communicatively coupling said at least one UPS to said catcher system; and
    at least one second communications channel, wherein each STS is communicatively coupled to said associated UPS by a second communications channel of said at least one second communications channel.

2. A power supply system in accordance with claim 1, wherein said catcher system is operable to transmit a first message across said first communications channel to said at least one UPS, the first message indicating that said catcher system is operating above a predetermined capacity.

3. A power supply system in accordance with claim 2, wherein said at least one UPS comprises a rectifier-inverter path and a bypass path, and wherein said at least one UPS is operable to, in response to receiving the first message, at least one of enable said bypass path for activation and modify an activation mechanism of said bypass path.

4. A power supply system in accordance with claim 2, wherein said at least one UPS is operable to, in response to receiving the first message, transmit a second message across said at least one second communications channel to said at least one STS, the second message instructing said at least one STS to disable supplying power to the associated load from said catcher system.

5. A power supply system in accordance with claim 1, wherein said at least one STS is operable to transmit a first message across said at least one second communications channel to said at least one UPS, the first message indicating that said at least one STS is incapable of supplying power to the associated load from said catcher system.

6. A power supply system in accordance with claim 5, wherein said at least one UPS comprises a rectifier-inverter path and a bypass path, and wherein said at least one UPS is operable to, in response to receiving the first message, at least one of enable said bypass path for activation and modify an activation mechanism of said bypass path.

7. A power supply system in accordance with claim 1, wherein said at least one STS is operable to transmit a first message across said at least one second communications channel to said at least one UPS, the first message indicating that a short-circuit has occurred at an output of said at least one STS.

8. A power supply system in accordance with claim 1, wherein said catcher system is operable to transmit a first message across said first communications channel to said at least one UPS, the first message indicating that said catcher system is unloaded, and wherein said at least one UPS is operable to, in response to receiving the first message, synchronize to a phase of an output of said catcher system.

9. A power supply system in accordance with claim 1, wherein said at least one UPS is operable to exchange capability information with said catcher system across said first communications channel, the capability information including a capability of said catcher system and requirements of the at least one associated load, said at least one UPS and said at least one STS selectively configurable based on the exchanged capability information.

10. A power supply system in accordance with claim 1, wherein said first communications channel comprises at least one intelligent synchronization module.

11. A method of operating a power supply system that includes at least one uninterruptible power supply (UPS), a catcher system including at least one catcher UPS, and at least one static transfer switch (STS), each STS of the at least one STS electrically coupled between an associated UPS of the at least one UPS and an associated load, each STS further electrically coupled between the catcher system and the associated load, and each STS operable to selectively switch between supplying power to the associated load from the associated UPS and supplying power to the associated load from the catcher system, said method comprising:

transmitting at least one message over at least one of a first communications channel and at least one second communications channel, wherein the first communications channel communicatively couples the at least one UPS to the catcher system, and wherein each STS is communicatively coupled to the associated UPS by a second communications channel of the at least one second communications channel.

12. A method in accordance with claim 11, wherein transmitting at least one message comprises transmitting a first message across the first communications channel from the catcher system to the at least one UPS, the first message indicating that the catcher system is operating above a predetermined capacity.

13. A method in accordance with claim 12, wherein the at least one UPS includes a rectifier-inverter path and a bypass path, and wherein said method further comprises at least one of enabling the bypass path for activation and modifying an activation mechanism of the bypass path.

14. The method of claim 12, wherein transmitting at least one message further comprises transmitting a second message across the at least one second communications channel from the at least one UPS to the at least one STS, the second message instructing the at least one STS to disable supplying power to the associated load from the catcher system.

15. A method in accordance with claim 11, wherein transmitting at least one message comprises transmitting a first message across the at least one second communications channel from the at least one STS to the at least one UPS, the first message indicating that the at least one STS is incapable of supplying power to the associated load from the catcher system.

16. A method in accordance with claim 15, wherein the at least one UPS includes a rectifier-inverter path and a bypass path, and wherein said method further comprises at least one of enabling the bypass path for activation and modifying an activation mechanism of the bypass path.

17. A method in accordance with claim 11, wherein transmitting at least one message comprises transmitting a first message across the at least one second communications channel from the at least one STS to the at least one UPS, the first message indicating that a short-circuit has occurred at an output of the at least one STS.

18. A method in accordance with claim 11, wherein transmitting at least one message comprises transmitting a first message across the first communications channel from the catcher system to the at least one UPS, the first message indicating that the catcher system is unloaded.

19. A method in accordance with claim 18, further comprising synchronizing the at least one UPS to a phase of an output of the catcher system.

20. A method in accordance with claim 11, wherein transmitting at least one message comprises exchanging capability information between the at least one UPS and the catcher system across the first communications channel, the capability information including a capability of the catcher system and requirements of the at least one associated load, said method further comprising selectively configuring the at least one UPS and the at least one STS based on the exchanged capability information.

* * * * *